United States Patent [19]

Wallace

[11] Patent Number: 4,520,587
[45] Date of Patent: Jun. 4, 1985

[54] TUBULAR FISHING ROD WITH INTEGRAL HANDLE-REEL SEAT

[76] Inventor: Leonard D. Wallace, 1 S. Strawberry St., Philadelphia, Pa. 19106

[21] Appl. No.: 477,118

[22] Filed: Mar. 21, 1983

[51] Int. Cl.³ .............................................. A01K 87/00
[52] U.S. Cl. ..................................... 43/18.1; 43/18.5; 43/23
[58] Field of Search .................... 43/18.1, 18.5, 23; 145/61 C

[56] References Cited

U.S. PATENT DOCUMENTS

| | | | |
|---|---|---|---|
| 2,830,399 | 4/1958 | Davis | 43/23 |
| 3,186,122 | 6/1965 | Clock | 43/18.5 |
| 3,197,908 | 8/1965 | Hirsch | 43/23 |
| 3,443,335 | 5/1969 | Guydos | 43/22 |
| 3,466,783 | 9/1969 | Priebe | 43/23 |
| 3,770,033 | 11/1973 | Gavillet | 145/61 C |
| 4,083,141 | 4/1978 | Shedd et al. | 43/22 |
| 4,398,369 | 8/1983 | Wiebe | 43/23 |
| 4,418,732 | 12/1983 | Kolonia | 145/61 C |

FOREIGN PATENT DOCUMENTS 2237575 2/1975 France ................. 43/18.1

Primary Examiner—Nicholas P. Godici
Assistant Examiner—Kurt Rowan

[57] ABSTRACT

A fishing rod having a tubular rod section and an integral handle-reel seat. The handle-reel seat includes an insert in the form of a reinforcing rod on which the handle is molded in situ. The reinforcing rod extends out of the handle for frictional engagement and receipt within the hollow interior of the rod section to secure the rod section to the handle. The interior of the rod section receiving the insert is tapered, as is the extending portion of the insert, to ensure that good frictional engagement between the rod section an insert results irrespective of wear on the engaging surfaces.

15 Claims, 4 Drawing Figures

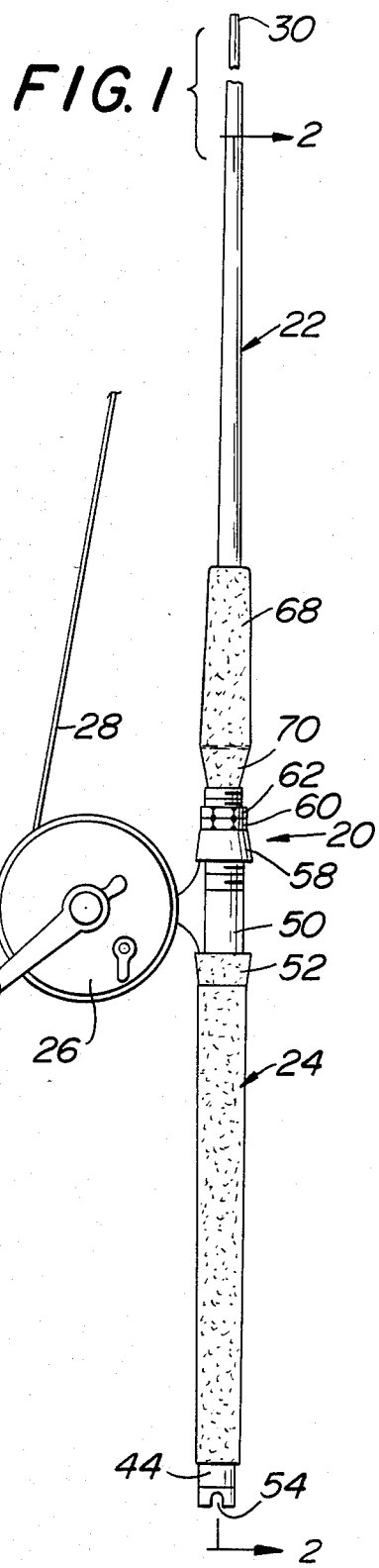
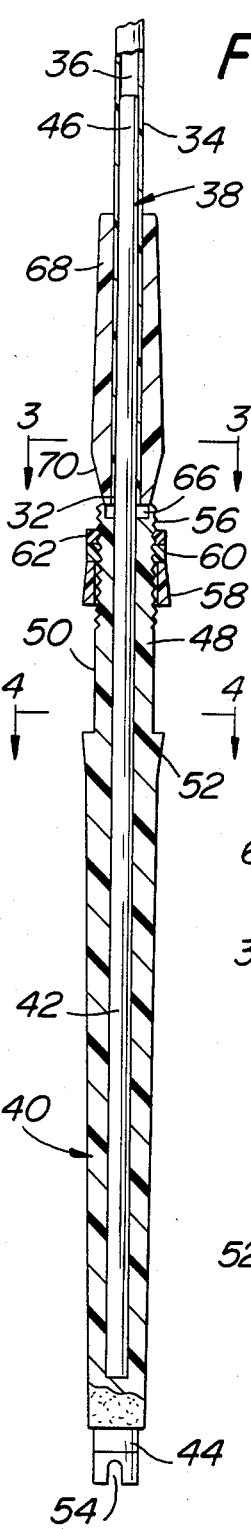
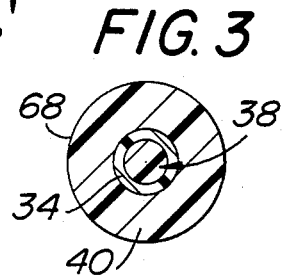
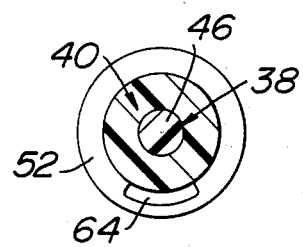

TUBULAR FISHING ROD WITH INTEGRAL HANDLE-REEL SEAT

BACKGROUND OF THE INVENTION

This invention relates generally to fishing rods and, more particularly, to rods having means for an integral handle-reel seat for securing a tubular section rod tip thereto.

Most conventional fishing rods used for deep sea sport fishing are made of three primary sections, the rod blank or tip, the handle or butt, and the reel seat. The end of the butt is frequently in the form of a gimbal having intersecting notches to support the rod in various positions on a rod gimbal. High forces are frequently encountered in game fishing, which forces are transmitted through the rod to the butt assembly. Prior art rods formed of separate blank, handle and reel seats which are mechanically secured, e.g., epoxied, together are susceptible to breakage when the applied forces are great, as frequently occurs during sport fishing.

In my co-pending U.S. patent application Ser. No. 253,334 now U.S. Pat. No. 4,403,439 filed on Apr. 13, 1981, and whose disclosure is incorporated by reference herein, there is disclosed an integral fishing rod, handle and reel seat which is simple in construction, relatively low in cost, yet provides good resistance to breakage at the handle. To that end, that rod comprises an integral rod, handle and reel seat. The rod comprises an elongated pole formed of fiberglas and having a distal end. The handle and reel holder comprise an elongated cylindrical member molded of a plastic material and having a front end in the form of a reel seat and the rear end in the form of a gimbal butt. The rod is permanently secured on the handle by molding the handle in situ on the distal end of the rod, with the distal end of the rod extending into the handle substantially the entire length thereof to a point immediately adjacent to the gimbal butt to serve as reinforcement for the handle.

While the rod disclosed in my aforementioned patent application is resistant to breakage and can be manufactured expeditiously, is not susceptible to disassembly of the rod tip from the handle in order to facilitate storage or transportation.

Numerous commercially available tubular section rods have been constructed to enable the repeated connection and disconnection of the rod tip or pole from the handle or butt. Such constructions typically have included a male ferrule formed of either brass, aluminum or chromium-plated steel at the bottom end of the rod tip and which is adapted to be frictionally fit within a mating female connector in the reel seat of the handle or butt. Typically, the reel seat is constructed of aluminum, brass or chromium-plated steel.

While prior art fishing rods constructed as described above are initially suitable for ready connection and disconnection, they frequently lose their capacity for such connection and disconnection due to corrosion of the connecting members. To overcome the corrosion problem some prior art rods have substituted fiberglas, phenolic, or other plastic materials for the connecting ferrules and reel seats. However, such rods have not proved sufficiently durable for long-term connection and disconnection inasmuch as the repeated connection and disconnection results in the wearing and loosening of the mating parts, thereby rendering the rods susceptible to accidental disconnection or breakage.

OBJECTS OF THE INVENTION

Accordingly, it is the general object of the instant invention to provide a fishing rod which overcomes the disadvantages of prior art connectable fishing rods while also providing the strength features of the rod of my aforenoted co-pending patent application.

It is a further object of the instant invention to provide a fishing rod which includes means for repeated connection and disconnection of the rod tip to the handle and which is resistant to wear.

It is a further object of this invention to provide a fishing rod including frictional connection means for connecting the rod tip to the handle and which means automatically compensates for wear of the engaging surfaces.

It is yet a further object of this invention to provide a fishing rod having a releasably securable pole tip which, when the tip is secured to the rod's handle, results in a rod which is resistant to breakage at the connection or along the handle.

SUMMARY OF THE INVENTION

These and other objects of the instant invention are achieved by providing a fishing rod comprising a handle and a rod tip, said rod tip comprising a tubular section in the form of an elongated member, having a free end, the outer diameter of said tubular section decreasing from a point adjacent said handle to a point adjacent said free end, said handle comprising a reinforcing insert having a first end portion arranged for disposition within said outer shell and a second end portion extending into said handle, with said handle being molded in situ on said second end portion, said insert being formed of a tough, lightweight and corrosion resistant material and configured to matingly engage and frictionally fit within the interior of said tubular section when said insert is disposed therein to provide good securement between said rod tip and said handle.

Other objects and many of the attendant advantages of the instant invention will be readily appreciated when the same becomes better understood by reference to the following detailed description when considered in connection with the accompanying drawing wherein:

DESCRIPTION OF THE DRAWING

FIG. 1 is a side elevational view of a fishing rod, handle and reel holder assembly constructed in accordance with the instant invention;

FIG. 2 is an enlarged sectional view taken along line 2—2 of FIG. 1;

FIG. 3 is an enlarged sectional view taken along line 3—3 at FIG. 2; and

FIG. 4 is an enlarged sectional view taken along line 4—4 of FIG. 2.

DETAILED DESCRIPTION OF THE PREFERRED EMBODIMENT

Referring now to the various figures of the drawing wherein like reference characters refer the like parts, there is shown in FIG. 1 a fishing rod 20 constructed in accordance with the instant invention. The rod 20 basically comprises an elongated, tubular-section rod tip 22 and a handle-reel holder assembly 24. The handle-reel holder assembly 24 is includes a reel seat which is integrally formed with the handle and is similar in construction with the teachings of my aforementioned co-pending patent application. A conventional fishing reel 26 is mounted on the rod by the reel holder in a conventional manner. The specific construction of the reel holder assembly 24 will be described in detail hereinafter.

As is conventional, the rod section 22 includes a plurality of conventional eyelets (not shown) mounted on the rod section at spaced locations therealong to guide the fishing line 28 therethrough.

The rod tip 22 itself is an elongated hollow tubular member which, in accordance with a preferred embodiment of the invention, is formed of extruded fiberglass or some other tough, yet relatively flexible plastic or other man-made material. The rod tip section 22 includes a top or free end 30 and a bottom end 32 (FIG. 2). The sidewall of the section 22 is denoted by the reference numeral 34, and, as can be seen in FIGS. 2 and 3, is circular. The outside diameter of the sidewall 34 tapers downward from a point adjacent the bottom end 32 to a point adjacent tip 30. The thickness of the sidewall is relatively thin and also tapers down from a point adjacent the lower end 32 to a point adjacent the 30. For example, one practical embodiment of the rod tip of the present invention utilizes a section 22 whose outside diameter tapers from 10 millimeters at the lower end 32 to 4 millimeters at the tip end 30, with the wall thickness tapering uniformly from 2 millimeters adjacent the bottom end to 1.5 millimeters adjacent the tip end.

As should be appreciated from the foregoing, the hollow interior 36 of the rod section also tapers from the bottom end toward the tip end. The portion of the hollow interior 36 contiguous with the bottom end of the section is arranged to frictionally receive a portion (to be described later) of the handle-reel holder assembly 24 to effect the releasable connection of the rod tip to the handle.

It must be pointed out at this juncture that the rod tip section need not be tubular throughout its entire length as shown in the drawings herein. In this regard all that is necessary in accordance with this invention is that the rod section include a hollow tapered bore in its lower end for frictional receipt of the portion of the handle-reel holder assembly 24.

The handle-reel holder assembly 24 basically comprises a reinforcing insert in the form of an elongated rod-like member 38 on which the body 40 of the handle-reel seat is molded in situ. The body 40 may be solid (as shown) or may include voids or spaces therein in the interest of light weight and fabrication economy. Moreover, the in situ molding process of the handle body on the insert can be accomplished at one time or else in successive steps by molding successive longitudinally disposed handle sections on the insert. The rod-like insert includes a first end portion 42 extending substantially the entire length of the body 40 to a point immediately adjacent a gimbal 44 at the lower end of the handle. The opposed end 46 of the insert 38 extends out of the molded body for a substantial distance, e.g., 8 inches (20.3 cm). The outwardly extending portion of the insert is adapted to frictionally fit within the interior 36 of the rod section 22 contiguous with the lower end 32 thereof to effect the releasable securement of the section 22 onto the handle-reel seat assembly 24.

As described in my aforementioned co-pending application, the molding of the handle-reel seat body on the reinforcing insert 38 enables the fabrication of the handle-reel seat to be effected easily by eliminating various assembly steps required of prior art constructions, thereby resulting in substantial manufacturing economies.

In accordance with a preferred embodiment of this invention the handle-reel seat assembly 24 is preferably formed of a readily moldable, yet rugged and tough plastic material, e.g., nylon. The top end of the handle-reel seat assembly, denoted by the reference numeral 48 is in the form of an inverted reel seat 50 and lower reel retainer or hood 52. The lower end of the handle body is in the form of the previously mentioned gimbal butt 44. The gimbal butt is of conventional construction and includes transverse slots 54.

The remainder of the reel holder assembly is in the form of helical threads 56 extending about the reel seat 50 at the top end thereof. An upper ring or reel hood 58 is mounted on the reel seat and is held in place by a pair of hex nuts 60 and 62 screwed onto the threads 56 of the reel seat. Each of the reel hoods 52 and 58 includes a recess or slot 64 (FIG. 4) for receipt of the reel bracket, as is conventional.

In accordance with a preferred embodiment of this invention all of the separate components releasably secured on the reel seat of the reel holder assembly, i.e., the members 58, 60 and 62, and are formed of a tough plastic e.g., nylon, acrylonitrile-butadiene-styrene (ABS), etc.

As can be seen clearly in FIG. 2, the top end of the body at the reel seat includes an annular recess 66 extending about the insert 38 where it exits the handle. This recess serves as means for accommodating a portion of the rod section 22 in the event that the cooperating surfaces which establish the frictional engagement between the rod section and the handle wear away or erode. This feature will be considered in greater detail later.

As can be seen in FIGS. 1 and 2, a foregrip sleeve 68 is mounted on the rod tip section 22 adjacent the lower end 32 thereof. The sleeve 68 is of generally conventional construction except that it includes a tapered lower outer surface 70. The tapered surface 70 is arranged to fit within the annular recess 66 as the engaging surfaces of the rod tip and handle erode or wear away. This feature will also be considered in greater detail later.

As can be seen in FIGS. 2, 3, and 4, the portion of the insert 38 located within the handle body is centered therein and extends down the handle body for substantially the full length thereof, terminating closely adjacent to the gimbal butt. The insert serves as the connection means to cooperate with the tubular tip section 22 to connect the section to the handle by frictional engagement and to provide reinforcement for the connection and the handle. To that end the insert is is formed of a corrosion resistant and tough material, e.g., drawn or extruded, reinforced fiberglas or some tough plastic or other man-made material.

As should be appreciated by those skilled in the art, the disposition of the extruded fiberglas insert along the substantial length of the handle and through the reel seat provides substantial reinforcement to the material making up the handle-reel seat body. This feature is of considerable importance when the rod is used for large game fish or when otherwise subjected to high loads or flexing. Moreover, since the insert is secured within the handle by molding the handle on the insert in situ, fabrication of the rod is expedited.

The extending portion 46 of insert 38 is arranged to be closely received within the interior of tubular section 22 contiguous with the lower end 32 thereof to ensure good frictional engagement between the abutting surfaces. Therefore portion 46 is of circular periphery and tapers downward from the point at which it leaves the handle to a point adjacent its free end. Preferably the degree of taper is the same as the degree of taper of the interior 36 of the rod section.

The securement of the rod section to the handle is accomplished by inserting the insert portion 46 into the lower end of the rod section while rotating the rod section about its longitudinal axis. This action causes the projecting portion of the insert to penetrate into the hollow rod section until it can go no further. At this point the outer surface of the projecting portion 46 of the insert makes good frictional engagement with the interior surface 36 of the rod section.

As will be appreciated by those skilled in the art the frictional connection between the rod section 22 and the handle 24 as just described is self-compensating. By that it is meant that if either of the frictionally engaging surfaces wears away or erodes due to repeated connection and disconnection the insert 38 will penetrate deeper into the interior of the rod section, thereby ensuring that good frictional engagement is maintained for the life of the rod.

Moreover, by virtue of the use of the annular recess 66 in the handle and the tapered end 70 of the foregrip, no interference is presented to further penetration into the tubular section by the insert portion 46. In this regard if the insert has to extend deeper into the rod section the tapered end of the foregrip can extend into the recess to enable such deeper penetration.

It must be pointed out at this juncture that the rod section 22 can, if desired, be permanently secured to the handle by use of epoxy or some other adhesive. In such a case the extending portion 46 of the insert serves as reinforcement for the connection.

As will be appreciated by those skilled in the art the instant invention provides a rod which is simple, yet rugged in construction, can be made inexpensively, is suitable for repeated effective and easy connection and disconnection without impediment for the life of the rod, and is corrosion resistant.

Without further elaboration, the foregoing will so fully illustrate my invention that others may, by applying current or future knowledge, readily adapt the same for use under various conditions of service.

I claim:

1. A fishing rod comprising a handle and a rod tip section, said rod tip section comprising a tubular section in the form of an elongated member having a free end, the outer diameter of said tubular section decreasing from a point adjacent said handle to a point adjacent said free end, said handle including a reinforcing insert having a first end portion arranged for disposition within said section and a second end portion extending into said handle, with said handle being molded in situ on said second end portion, said insert being of rod-like construction and configured to matingly frictionally engage the interior of said tubular section when said insert is disposed therein to provide good securement between said rod tip and said handle, said fishing rod including recess means within said handle permitting said insert to penetrate further into the tubular section of said rod tip section without interference caused by abutting portions of said rod tip section and said handle in the event that either of the engaging portions of the insert or the rod tip section wear away upon repeated use, to thereby maintain said good securement.

2. The fishing rod of claim 1 wherein said insert comprises a strong, corrosion-resistant material.

3. The fishing rod of claim 2 wherein said corrosion-resistant material comprises reinforced fiberglass.

4. The fishing rod fo claim 3 wherein said reinforced fiberglass is drawn.

5. The fishing rod of claim 1 wherein said tip section is formed of a strong, corrosion-resistant, man-made material.

6. The fishing rod of claim 5 wherein the material of said tip section comprises fiberglass.

7. The fishing rod of claim 6 wherein said fiberglass is wound.

8. The fishing rod of claim 1 wherein said reinforcing insert comprises a strong, corrosion-resistant material and wherein said rod tip section comprises a strong, corrosion-resistant material.

9. The fishing rod of claim 8 wherein said material of said insert comprises reinforced drawn fiberglass and wherein said material of said shell section comprises wound fiberglass.

10. The fishing rod of claim 9 wherein said handle is formed of a plastic.

11. The fishing rod of claim 10 wherein said plastic is nylon.

12. The fishing rod of claim 1 wherein said handle includes a reel seat integrally molded therewith for enabling a fishing reel to be secured thereto.

13. The fishing rod of claim 1 wherein the frictionally engaging portions of said rod tip and said handle are arranged to maintain good frictional engagement therebetween notwithstanding wear of said surfaces occasioned by repeated connection and disconnection of said rod tip to said handle.

14. The fishing rod of claim 1 wherein said recess means comprises a recess in said handle adapted to receive the lower end of said rod tip section.

15. The fishing rod of claim 14 wherein the extending portion of said reinforcing insert is tapered from a point adjacent the point at which it extends from said handle to a point adjacent its free end, whereupon said insert will automatically extend sufficiently far into the tapered interior of said section to ensure that good frictional engagement exists therebetween.

* * * * *